United States Patent
La Rovere et al.

(10) Patent No.: US 11,161,691 B2
(45) Date of Patent: Nov. 2, 2021

(54) CONTAINER PALLETIZING SYSTEM

(71) Applicant: Amazon Technologies, Inc., Seattle, WA (US)

(72) Inventors: Stefano La Rovere, Luxembourg (LU); Tolga Kol, Luxembourg (LU); Athanasios Voilis, Luxembourg (LU); Vidmantas Saltis, United Kingdom (GB)

(73) Assignee: Amazon Technologies, Inc., Seattle, WA (US)

( * ) Notice: Subject to any disclaimer, the term of this patent is extended or adjusted under 35 U.S.C. 154(b) by 67 days.

(21) Appl. No.: 15/887,473

(22) Filed: Feb. 2, 2018

(65) Prior Publication Data

US 2019/0241364 A1 Aug. 8, 2019

(51) Int. Cl.
| | |
|---|---|
| *G06F 7/00* | (2006.01) |
| *B65G 1/137* | (2006.01) |
| *B65G 43/08* | (2006.01) |
| *B65G 1/16* | (2006.01) |
| *B65G 1/14* | (2006.01) |

(52) U.S. Cl.
CPC .............. *B65G 1/137* (2013.01); *B65G 1/14* (2013.01); *B65G 1/16* (2013.01); *B65G 43/08* (2013.01)

(58) Field of Classification Search
CPC .......... B65G 1/137; B65G 43/08; B65G 1/16; B65G 1/14; B65G 47/907
USPC ................. 700/213, 214, 216–217, 228, 229
See application file for complete search history.

(56) References Cited

U.S. PATENT DOCUMENTS

| | | | |
|---|---|---|---|
| 5,121,877 A | | 6/1992 | Bodary et al. |
| 6,135,704 A | * | 10/2000 | Seaberg ............... B66F 9/183 294/119.1 |
| 2005/0220600 A1 | | 10/2005 | Baker et al. |
| 2009/0148266 A1 | * | 6/2009 | Baumann ............. B65G 59/023 414/796.2 |
| 2012/0039699 A1 | | 2/2012 | Ward et al. |
| 2014/0054359 A1 | | 2/2014 | Benigni et al. |
| 2015/0336754 A1 | * | 11/2015 | Morency ............. B65G 59/023 414/796.2 |
| 2017/0073173 A1 | | 3/2017 | Kuhn et al. |

FOREIGN PATENT DOCUMENTS

| | | |
|---|---|---|
| WO | WO 2013/064795 A2 | 5/2013 |
| WO | WO-2013064795 A2 * | 5/2013 |
| WO | WO 2017/027751 A1 | 2/2017 |

OTHER PUBLICATIONS

International Patent Application No. PCT/US2019/016384; Int'l Search Report and the Written Opinion; dated Jul. 11, 2019; 20 pages.
International Patent Application No. PCT/US2019/016384; Invitation to Pay Add'l Fees; dated May 16, 2019; 15 pages.
International Patent Application No. PCT/US2019/016384; Int'l Preliminary Report on Patentability; dated Aug. 13, 2020; 13 pages.

* cited by examiner

*Primary Examiner* — Yolanda R Cumbess
(74) *Attorney, Agent, or Firm* — BakerHostetler (57) ABSTRACT

A system and method for automated palletization of totes and cuboid containers includes an end effector having fingers projecting outwardly. The fingers may engage recesses in the totes. Alternatively, actuators on fixed fingers can move gripping surfaces into engagement with the totes or containers. Or actuators on a body of the end effector can move the fingers, which include gripping surfaces.

8 Claims, 11 Drawing Sheets

CONTAINER PALLETIZING SYSTEM

BACKGROUND

This invention is related to container transport, and more particularly to machinery and methods for stacking, moving, and palletizing containers, such as totes or cuboid boxes.

Figure 7:
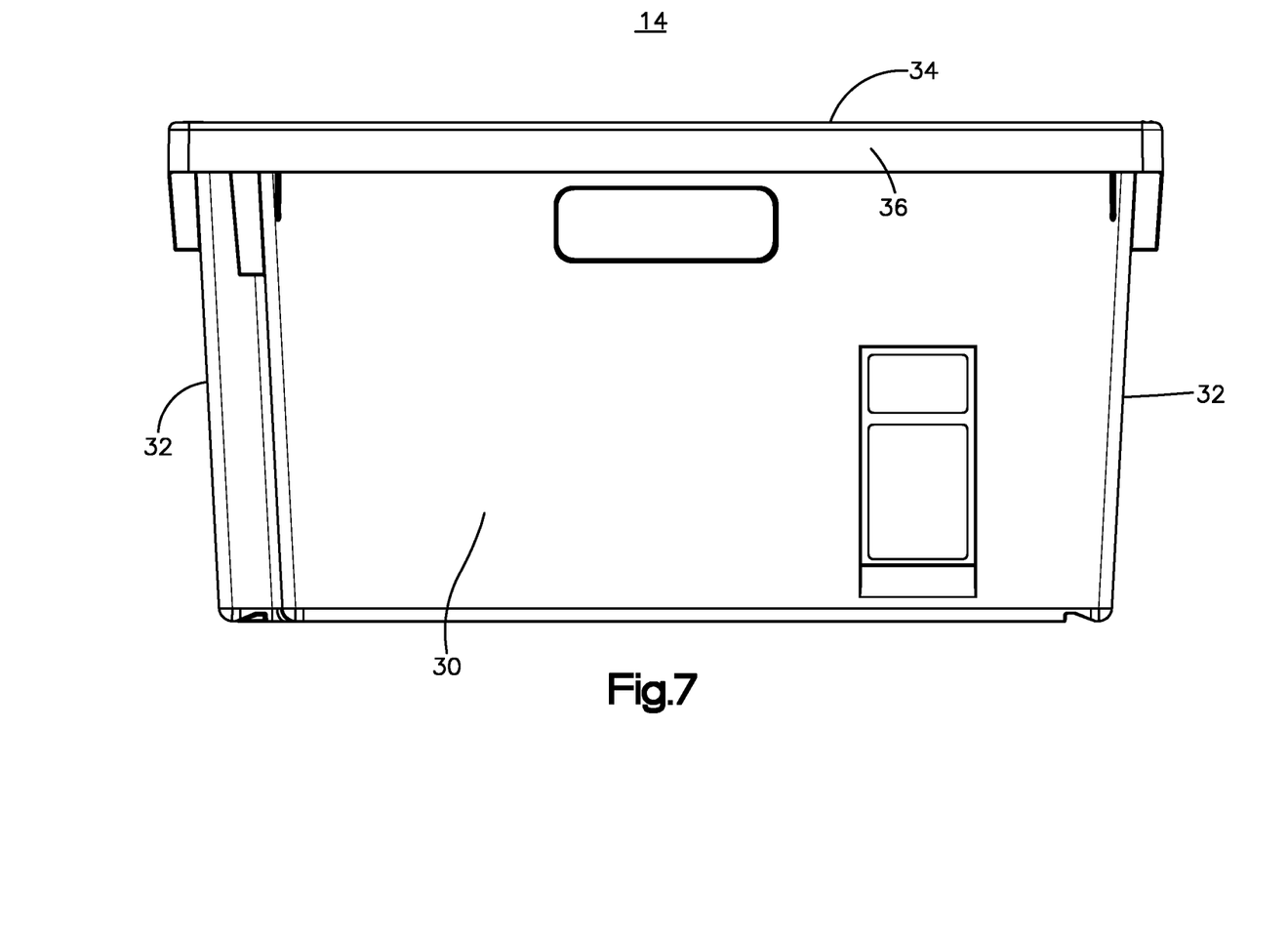
FIG. 7 is side view of a tote of the type that can be employed with the system according to an aspect of the present invention.
Figure 8:
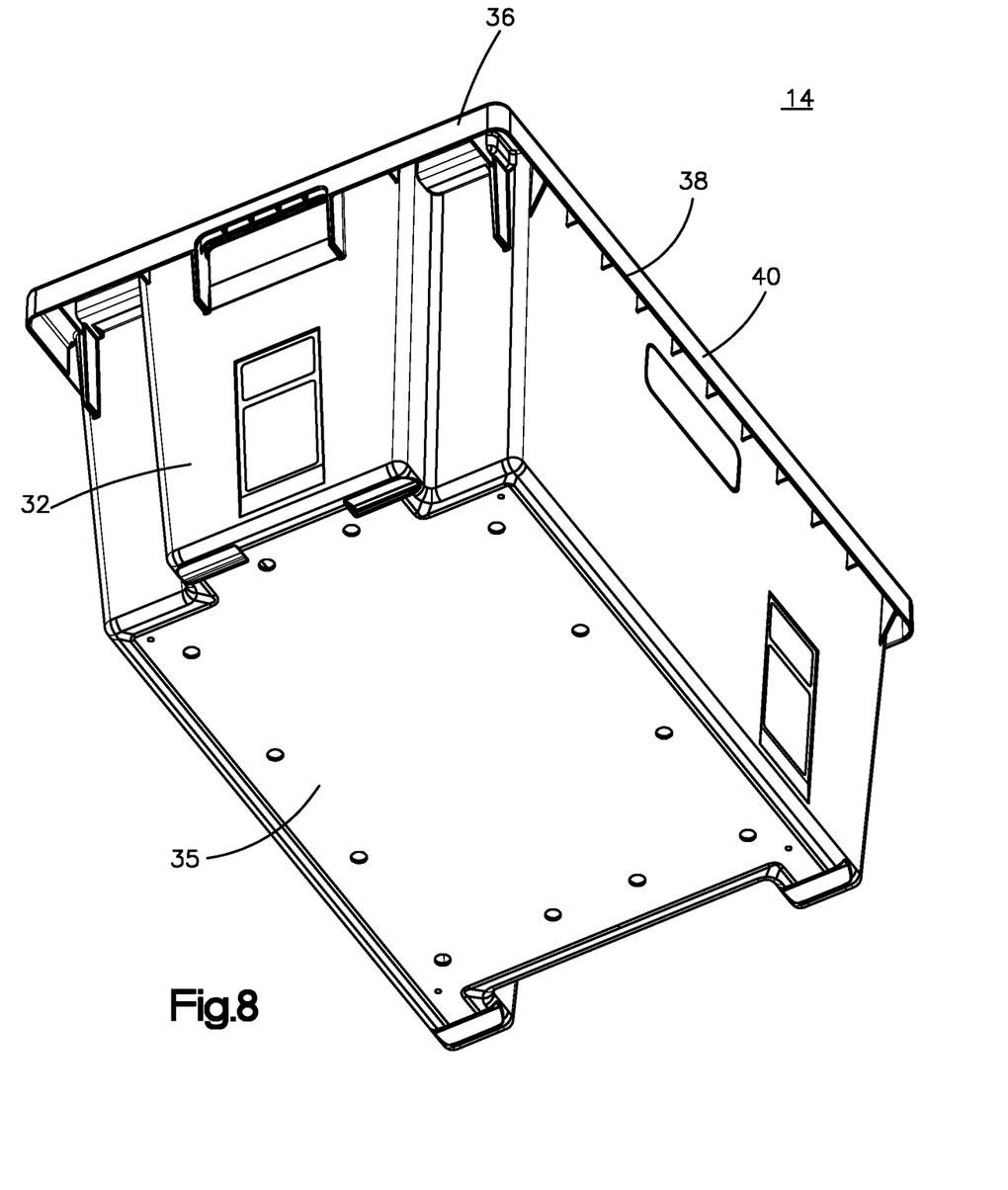
FIG. 8 is a bottom perspective view of the tote of FIG. 1.

In some modern fulfillment centers, products are placed into open-top containers referred to as totes for containment as the products are moved. FIG. 7 and FIG. 8 illustrate conventional totes that hold items for movement within a fulfillment center.

Often, totes or like containers are placed on a pallet for transport to other areas within a fulfillment center or another facility. The conventional method for loading totes or like containers onto a pallet is to place them in a horizontal array, one at a time. In some cases, a horizontal row of containers is picked and placed—one row at a time. Then, when an entire horizontal layer is complete on the pallet, another container or another horizontal row of containers is stacked one at a time on top of the existing container row. In some applications, especially when boxes of differing footprints are being palletized, a box may be placed on top of another box on the pallet if needed before completing a horizontal row or array.

DETAILED DESCRIPTION OF ILLUSTRATIVE EMBODIMENTS

An automated system and method for moving and palletizing totes and other containers includes an end effector and an automated arm for moving totes and/or containers. The automated arm can be any type, such as without limitation a robotic actuator or any mechatronic or mechanical structure that makes repeated movement under any kind of control. The end effector includes a structural, rigid vertical body including a mount for connecting to the automated arm. Multiple pairs of fingers extend from lateral sides of the body.

Each pair of fingers is mutually parallel in a horizontal plane, and mutually, laterally spaced apart to enable engaging a tote. The term "horizontal plane" as used herein refers to a general horizontal orientation of the fingers to enable totes to be moved and/or lifted without items within the tote being subject to accidental falling out or ejection. The totes are oriented in a vertical stack, with one tote on top of another. Preferably the stack or column of totes are in mutual contact without any structure in between the totes. In the embodiments in which the totes are in mutual contact, it is preferred that the totes be stackable. In the tote embodiment shown in the figures, the capability to stack the totes exists when a tote is oriented opposite or 180 degrees from its adjacent totes. And the totes (shown in the figures) when all aligned in the same direction nest within one another, as will be understood by persons familiar with conventional totes.

Each tote includes a pair of opposing sidewalls, a flange extending outwardly from a top of each sidewall, and a lip extending downwardly from each flange. An elongate recess is formed beneath each flange between the sidewall and the lip. The finger is configured to engage the tote by being received in the recess to enable moving and lifting the tote. Thus, the end effector and totes are configured such that lifting the end effector lifts the fingers and thereby lifts the stack of totes for placing on a pallet. The term "pallet" as used herein broadly refers to any structure on which totes or containers can be loaded for subsequent transport as a unit. The term "tote" as used herein refers broadly to totes and cuboid containers, such as boxes.

The system optionally includes a frame that has a pair of opposing side structures such as walls or like structures, that are adapted for receiving the totes in a stack. The side structures are vertical and spaced apart to promote vertical alignment of the totes. In this regard, the side structures may be mutually spaced apart by a distance equal to the width of the tote plus a small clearance to enable sliding contact between the side structures and the totes, or may be spaced by a distance of a few inches merely to prevent the stack of totes from falling over if grossly misaligned, or may be spaced apart by any other distance to promote vertical alignment as understood by persons familiar with tote movement and palletizing. The frame has open ends between edges of the side structures such that totes can be feed and extracted. The present invention is not limited to employing a frame for receiving or stabilizing a column of totes unless expressly recited in the claims.

A corresponding method of moving totes in a column includes stacking the totes (optionally within the frame), engaging the totes with fingers of the end effector, and moving the stack of totes via movement of the end effector via movement of the automated arm. The vertical stack of totes is placed onto a pallet, and then the steps are repeated to place another stack in close proximity to the existing stacks on the pallet. The system increases throughput of the production and distribution lines and other applications that employ pick and place functions and/or palletization, as it provides a high density method of picking containers in a column of multiple totes.

An additional embodiment of an end effector includes inwardly directed actuators affixed to rigid fingers to engage and release the totes or container. Another embodiment of an end effector includes actuators affixed between the body of the end effector and the fingers such that the fingers move inwardly and outwardly to engage and release the totes or containers.

The inventors surmise that a column of between three and six totes is preferred, thereby (it is believed) enabling a throughput increase by a factor three through six, reduction of footprint of the equipment, and overall reduction in the cost of equipment. The advantages are based on current, conventional methods of picking one unit at the same time, or picking multiple totes in a horizontal (layer) in order to form a pallet. In this latter approach, the maximum number of pick-able items is limited by the footprint size of the pallet and by the reachability of the different products in the pallet. In other words, placing totes in a horizontal array is difficult in some instances because of limitations on the placing equipment. Reaching all totes in the same layer of a pallet can be challenging for an automated arm because the totes abut one another with minimal distance to enable manipulation.

Further, the system and method described herein enables containers of multiple or differing heights to be palletized. For example, in the traditional, horizontal loading, all boxes in a layer are typically the same height for stability of the load on the pallet. But in the system and method described herein, stability is enhanced as only the three to six totes or containers in a stack should be the same footprint, and each stack can be formed of containers having footprints and heights different from those of adjacent stacks.

Moreover, picking and placing horizontal groups of products can lead to "flowering" problems with the pallet, which may lead to instability of the pallet due to mis-positioning of the totes or containers. The system and method described herein inherently improves precision of the vertical alignment.

Referring to the FIGS. 1 through 6, a tote palletizing system 10 includes an automated arm 8, an end effector 12, totes 14, and (optionally) a frame 16. As illustrated best in FIGS. 7 and 8, each tote 14 preferably is an integral, high-impact plastic unit that includes a pair of tote sidewalls 30 and tote endwalls 32 having a common enclosed bottom 35 to form an open-top container. A flange 34 wraps around the periphery of the upper edge of each sidewall 30 and end wall 34. A lip 36 extends downwardly from the flange 34 such that a recess 38 is formed between an inboard surface of lip 36, outboard surfaces of walls 30 and 32, and a lower surface of flange 34. Preferably, gussets 40 span recess 38 to reinforce the flange and lip.

End effector 12 includes a structural body 50, such as a vertical body that during operation is oriented vertically. In this regard, the term "vertical" refers to a general orientation, and perfect verticality and uniformity is not required, nor does the term "vertical" mean that the structure is required to be straight. Rather, the particular structural shape and verticality can be determined to meet the particular design parameters of the application, as will be understood by persons familiar with robotic or automated systems and their function.

A mount 52 in the embodiment shown in the figures is a stub that is normal to the long axis of body 50. The mount can be any configuration to enable end effector 12 to be coupled to an automated arm 8, which arm as described above can take any form, according to the particular requirements of the application to which the system is put to use. Arm 8 is illustrated schematically in FIG. 2 by pointing to the interface between arm 8 and end effector mount 52.

Figure 1:
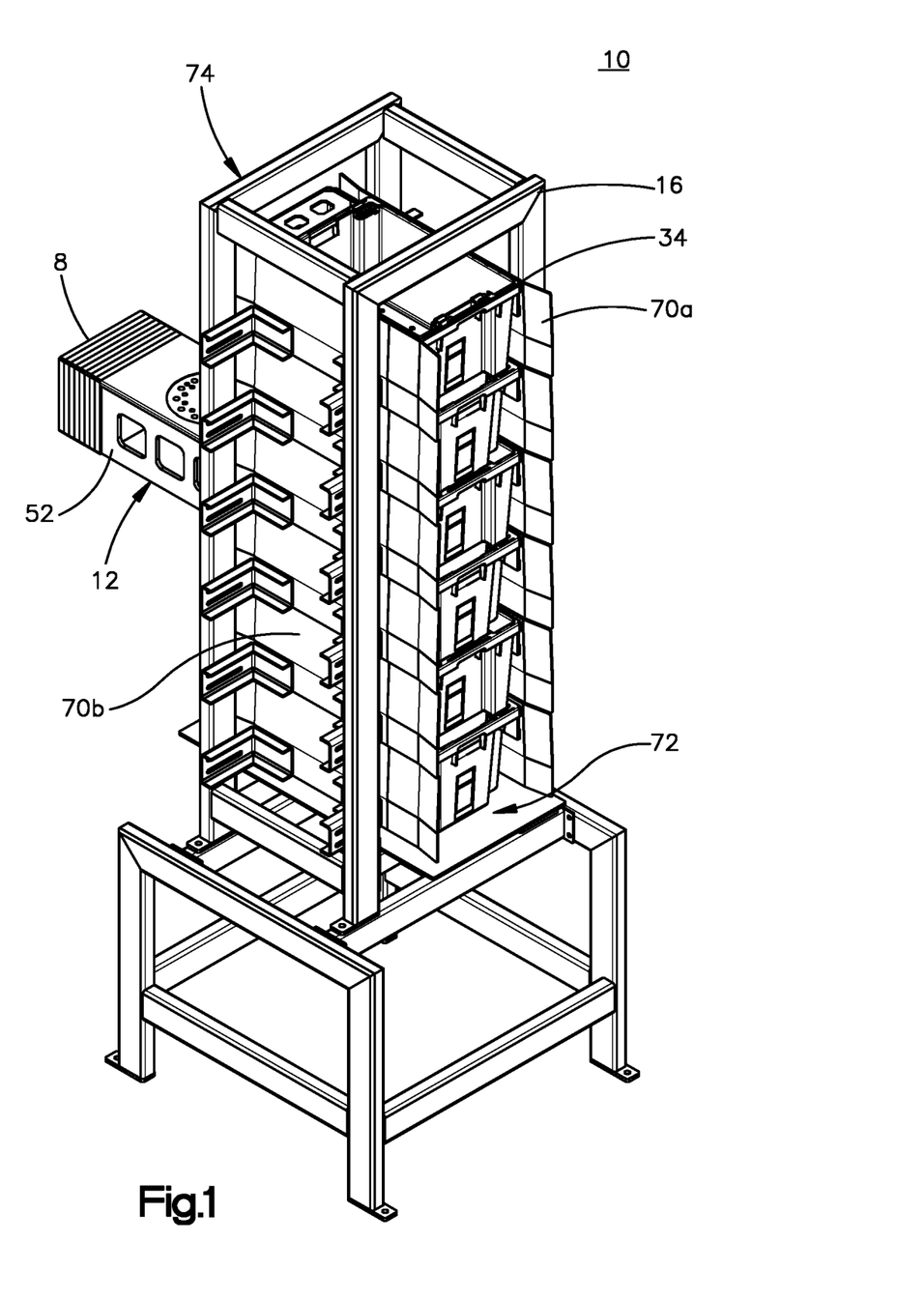
FIG. 1 is a perspective view of the automated tote palletizing system, including the end effector, totes, and frame.
Figure 2:
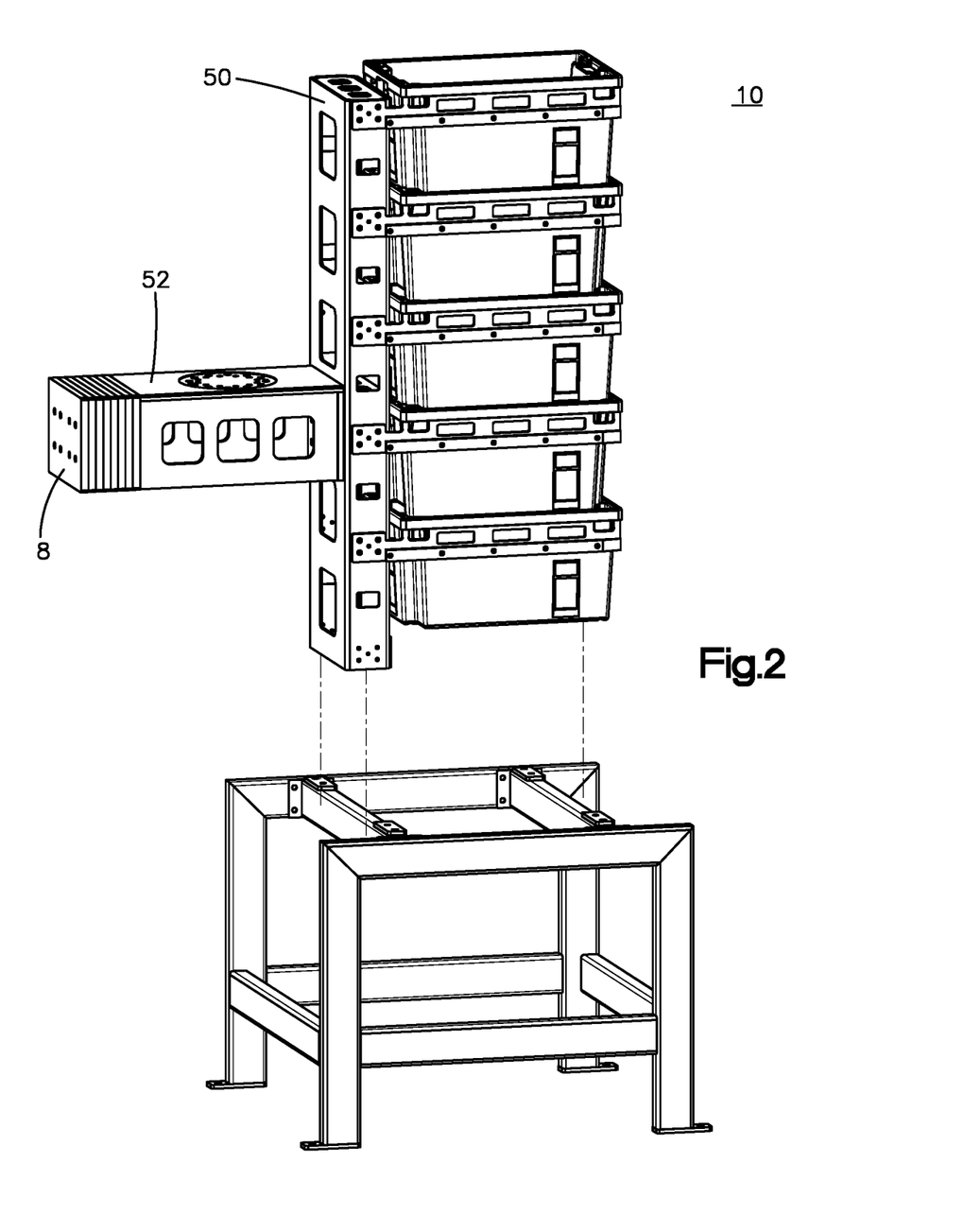
FIG. 2 is a perspective view the end effector of system of FIG. 1 loaded with totes.
Figure 3:
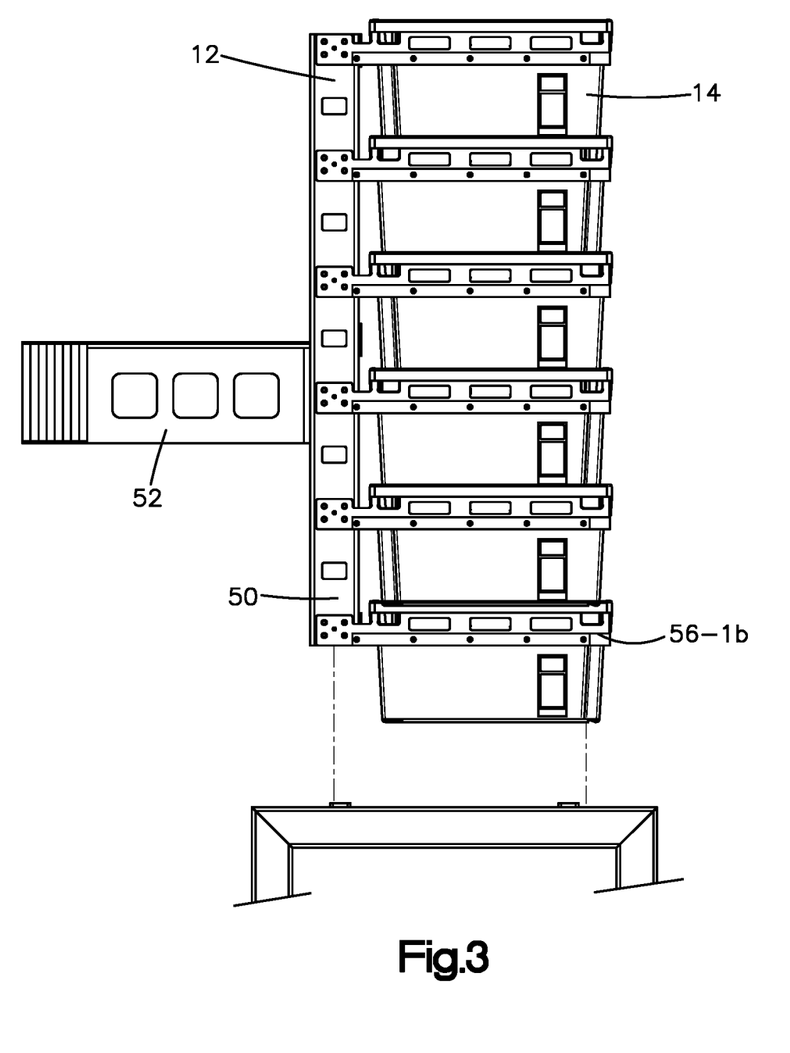
FIG. 3 is a side view of the end effector of the system of FIG. 1 loaded with totes.
Figure 4:
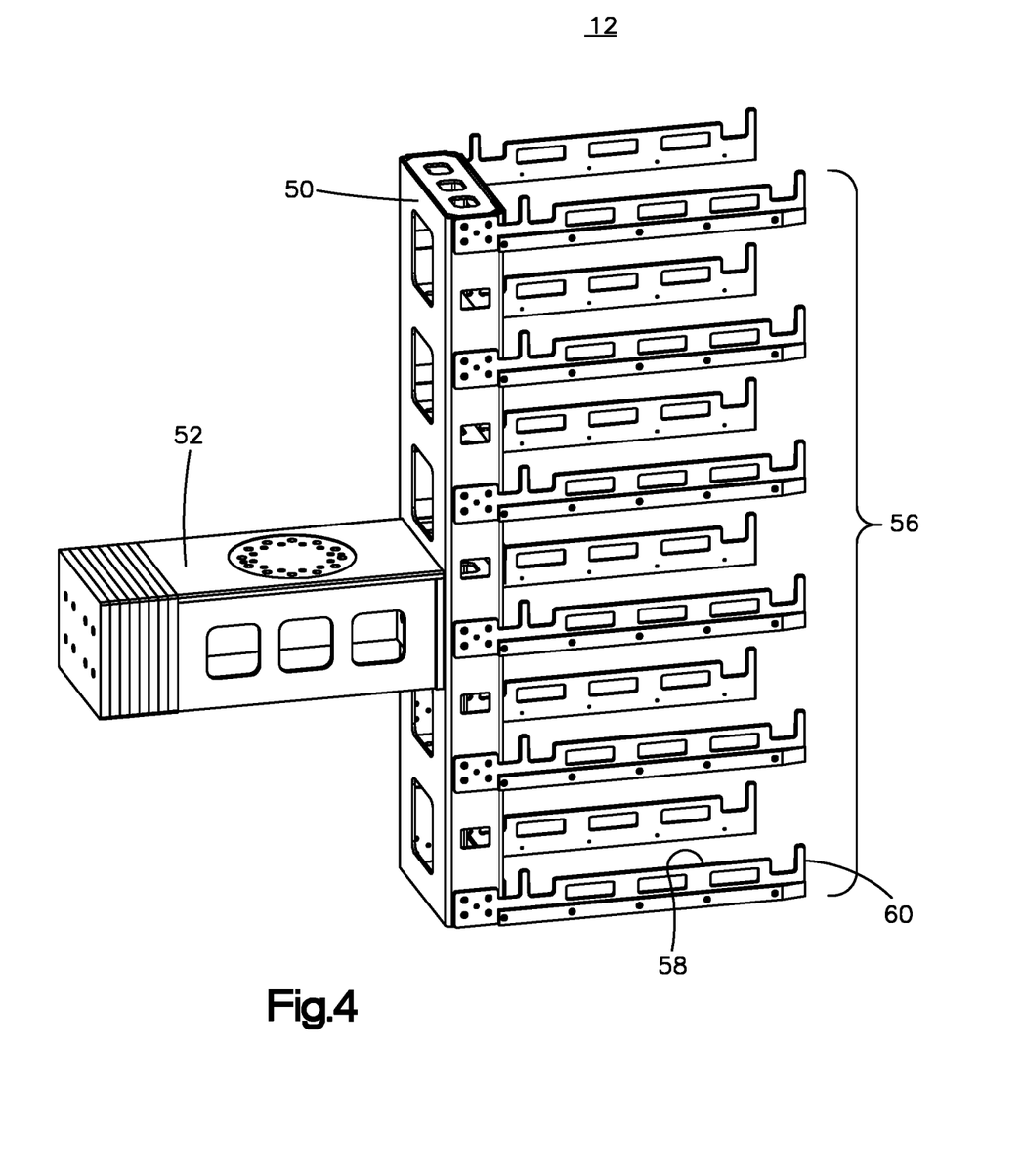
FIG. 4 is a perspective view of the end effector of the system of FIG. 1.
Figure 5:
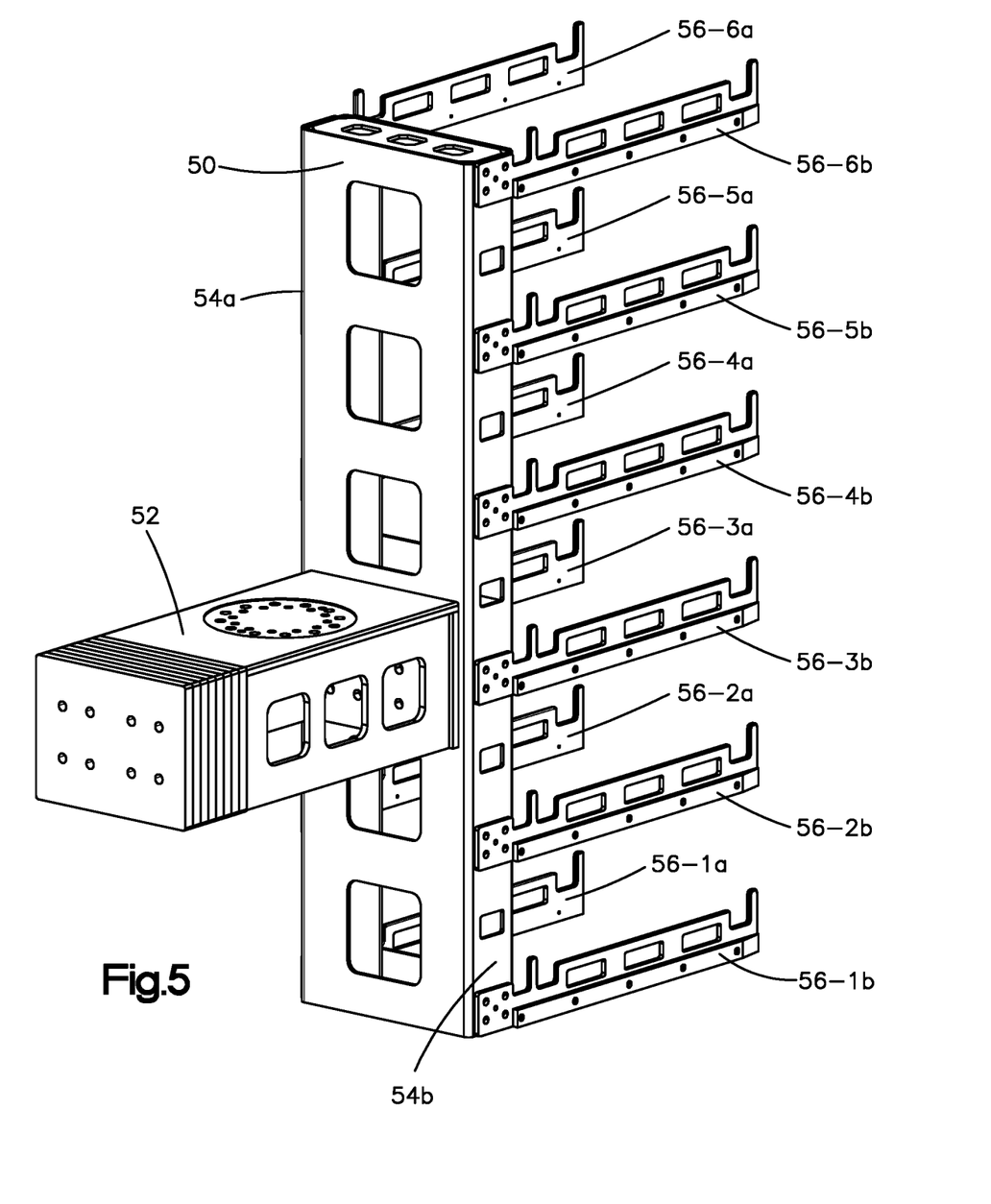
FIG. 5 is another perspective view of the end effector of the system of FIG. 1.
Figure 6:
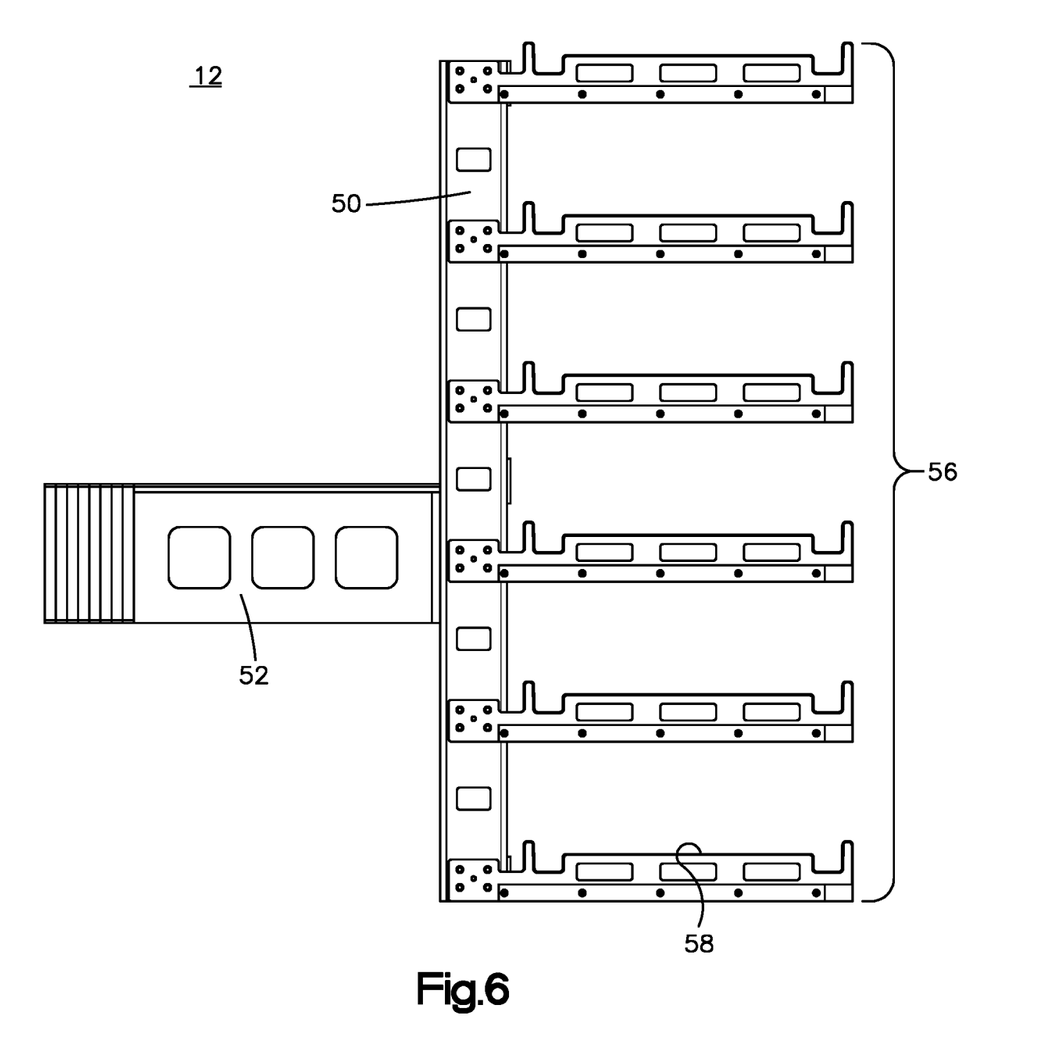
FIG. 6 is a side view of the gripper of the system of FIG. 1.

Body 50 includes lateral sides 54a and 54b, as best shown in FIG. 5. Multiple pairs of fingers 56 project outwardly from sides 54a and 54b. An appended reference number is used to indicate the vertical position of the pairs of fingers. In this regard, as indicated in FIGS. 4 and 5, a first pair of fingers 56-1a, 56-1b are at a first position on body 50, a second pair of fingers 56-2a, 56-2b are at a second position on body 50 that is vertically above the first pair of fingers 56-1a, 56-1b, and the like, as finger pairs 56-3a, 56-3b; 56-4a, 56-4b; 56-5a, 56-5b; and 56-6a, 56-6b extend outwardly from a front face of body 50 at progressively higher locations, one pair of fingers above another. Preferably, each pair of fingers 56 is vertically spaced apart from an adjacent pair of fingers by a dimension equal to the height of a corresponding tote such that all the fingers engage all the totes substantially simultaneously. The reference number 56 is used to refer generally to the fingers. Any number of pairs of fingers 56 may be employed according to the desired number of totes.

Alternatively, fingers 56 may be vertically spaced apart by a dimension that is greater than the corresponding height of the tote. In this way, an uppermost set of fingers 56-6a and 56-6b engage its corresponding tote, then next finger set 56-5a and 56-5b engage its corresponding tote, then finger set 56-4a and 56-4b engage its corresponding tote, etc. until all totes are engaged and lifted. The dimension may be small, such as one or two millimeters, relatively large, such as one or two inches, or other dimension consistent with the goals of the particular application. It is also contemplated that the fingers 56 may be vertically spaced apart by a dimension that is less than the corresponding height of the tote, but it is not preferred.

Figure 9:
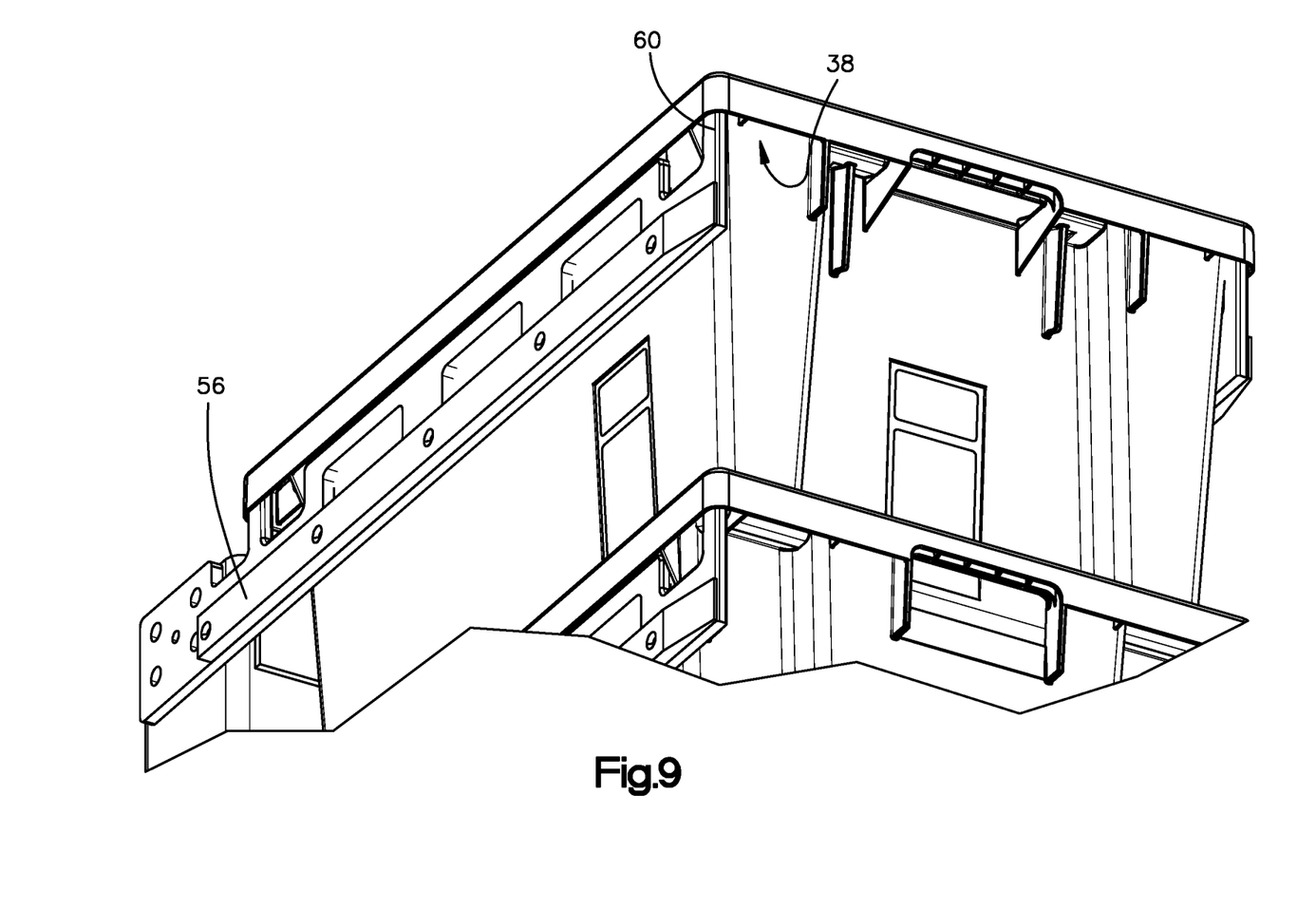
FIG. 9 is an enlarged perspective view, illustrating a finger engaged in an elongated recess of a tote.

Each finger 56 preferably is formed of a blade, which in the embodiment in the figures has a thickness of ¼ inch, having an upper edge 58. Preferably, an upstanding prong 60 projects upwardly from a distal end (that is, opposite body 50) of finger 56, as illustrated in FIG. 9. The thickness of finger 56 may be chosen to work with the dimension of recess 38. Fingers 56 can be formed on any material, such as steel, having suitable strength for engaging and lifting the totes. The blade-like structure is preferred to provide a high moment of inertia (and therefore stiffness) relative to the lifting direction and to provide a thin profile for entering into the space surrounding the totes or containers, and to enable placing a stack of totes or containers in close proximity to an adjacent stack of totes or containers. The present invention is not limited to any configuration or geometry of finger unless expressly set out in the claims. In this regard, the term "blade-like" refers to a relatively thin, elongate structure.

Frame 16 includes a pair of side structures, such as parallel, upright walls 70a and 70b that are spaced to receive totes 14. Frame 16 includes an open loading face 72 and an opposing open unloading face 74. A person or automated system can load totes 14 on top of the other within frame 16 to promote vertical alignment. Preferably, the inboard faces of walls 70a and 70b are featureless such that the weight of the totes is not supported by frame 16. Rather, the side structures (walls) 70a and 70b merely align or stabilize the column of totes. End effector 14 is sized to enter into the space between the walls 70a and 70b such that fingers 46 engage recesses 38 of the totes.

In operation, a person or automated system stacks multiple totes 14 one on top of another free from any alignment mechanism or within an alignment or stabilization mechanism, such as frame 16. End effector 12 is moved into position by arm 8 such that fingers 56 are aligned with recesses 38, preferably along sidewalls 30, of totes 14. In the embodiment shown in the figures, sidewalls 30 are tapered (that is, the dimension between the opposing sidewalls at the bottom is less than the dimension between the opposing sidewalls at the too), thus facilitating easy movement of the fingers 56 into position relative to recesses 38.

Arm 8 preferably moves end effector 16 vertically upwardly and (optionally) inwardly and thus the finger upper edge 58 enters recess 38 and engages the structure forming recess 38, such as the gussets, underside of lip 36, or the like. And distal end of recess 38 can act as a stop against prong 60. Fingers 56 upon engaging all totes 14 can move the stack of totes 14 to a position on a pallet, and then end effector 12 can repeat the engaging and moving functions to closely position another stack of totes adjacent to the existing stack or stacks of totes on the pallet, thereby enhancing stability and density of the pallet load. Because fingers 56 are thin blades, a stack of totes can be placed in close proximity to an adjacent, pre-existing stack of totes. The pallet can then be wrapped and transported as required, such as to another fulfillment center or like facility.

Figure 10:
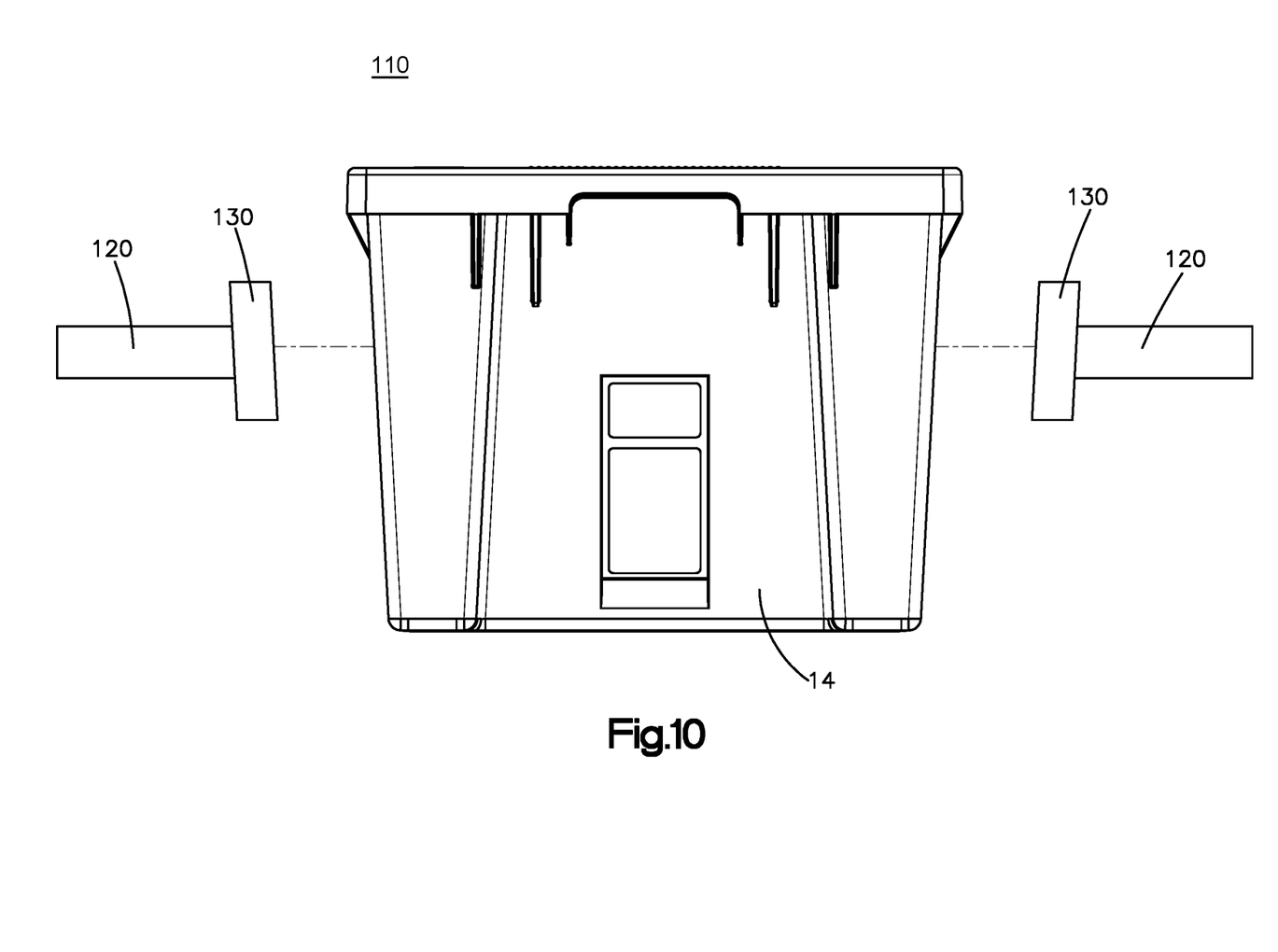
FIG. 10 is an end view of a tote and a schematic view of gripper and ready to engage the tote.

Referring to FIG. 10 to illustrate additional aspects and an embodiment of the invention, a tote palletizing system 110 includes an automated arm and an end effector 112 having a body 150. The arm and body can be as described for first tote palletizing system 10. End effector 112 includes fingers 156 rigidly affixed to the body and shown schematically in FIG. 11. Fingers 156 can be any configuration, and it is understood that fingers 156 encounter lateral or horizontal loads in addition to the vertical loads, as explained more fully below, and thus in many instances require greater strength against a horizontally applied force. Accordingly, the configuration and materials of fingers 156 may be chosen to have sufficient lateral strength and stiffness to transmit sufficient force via the gripping surfaces, as explained more fully below. Further, any configuration of fingers 156 may be employed, as will be understood by persons familiar with structural design and function for end effectors in automated movement of totes or containers.

Figure 11:
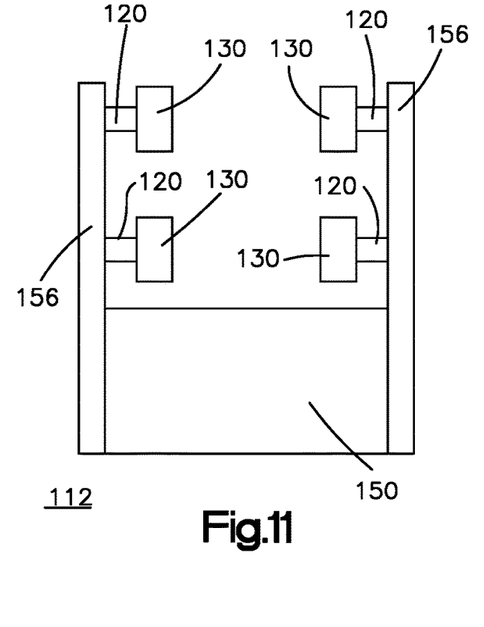
FIG. 11 is a schematic view of an first embodiment actuator and finger configuration.

System 110 includes at least one and preferably a pair of opposing actuators 120 that can extend inwardly from the opposing arms 156 to enable engagement with a tote or container. Actuators 120 also can retract relative to fingers 156 to release the tote or container. A gripping surface 130 is located on the contact surfaces of the actuators to enhance engagement between the contact surfaces 130 and the totes or containers. Gripping surface 130 can be a conventional non-slip or high friction pad, a conventional suction cup that can be connected to a vacuum or other structure that enhances grip. As illustrated in FIG. 11, a pair of actuators 120 may be employed on each finger 156 if required by the parameters of the particular application. In an embodiment (not shown in the figures) in which only one actuator is employed, it is preferred that one finger is rigidly attached to the body and the other finger is moveable by the actuator.

Figure 12:
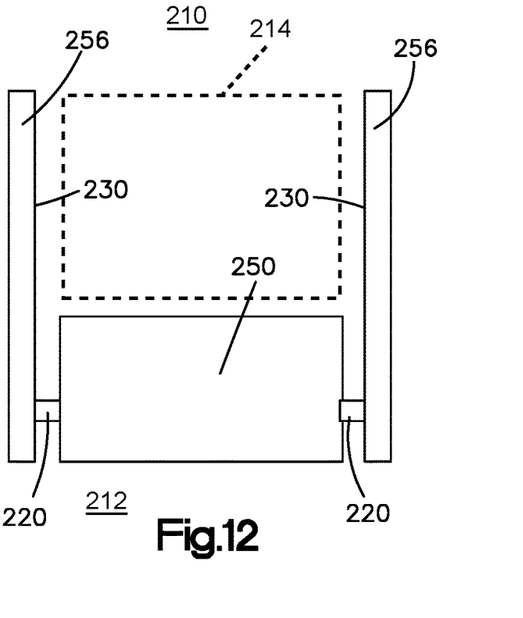
FIG. 12 is a schematic view of a second embodiment actuator and finger configuration.

Referring to FIG. 12 to illustrate additional aspects and another embodiment of the inventive system, a tote palletizing system 210 includes an automated arm and an end effector 212 having a body 250. The automated arm and the body 250 can be as described for first tote palletizing system 10. End effector 212 also includes a pair of opposing actuators 220 that are affixed between lateral sides of body 250 and fingers 256. As illustrated in FIG. 12, fingers 256 are moveable relative to body 250 such that retraction of actuators 220 moves fingers 256 inwardly to engage containers 214 and extension of actuators 220 moves fingers outwardly to release containers 214. A gripping surface 230 is located on inboard sides of fingers 256. Gripping surface 230 can be as described above for gripping surface 130.

Figure 13:
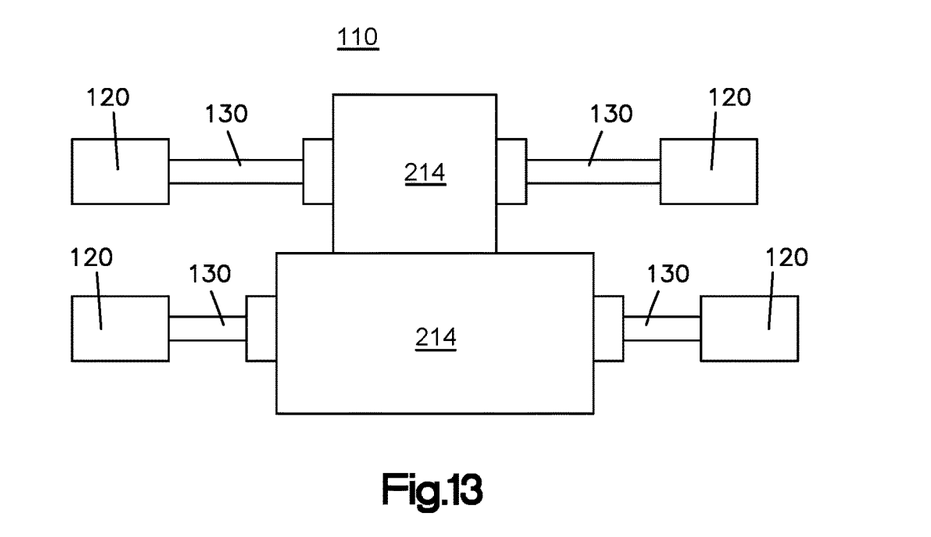
FIG. 13 is a schematic end view of grippers engaging box containers, illustrating gripping surfaces engaging boxes of differing sizes.

In operation, a person or automated system, such as system 110 shown in FIG. 13, stacks multiple totes or cuboid containers 214, such as boxes, one on top of another free from any alignment mechanism or within an alignment or stabilization mechanism, such as frame 16. End effector 112 or 212 is moved into position by arm 8 such that fingers 156 or 256 are aligned with the totes or containers and in a ready position for engagement. FIGS. 11 and 12 are schematic top views, and it is understood that multiple sets of vertically aligned fingers may be employed to engage a column or stack of totes or conveyors, as described above for first embodiment system 10.

In the embodiments of FIGS. 10 and 11, in which fingers 156 are stationary relative to body 150, actuators 120 extend such that griping surfaces 130 engage the totes or containers with sufficient force to enable the tote or container to be grasped and moved by movement of end effector 112. The magnitude of the force and the type of actuator employed may be chosen according to the particular parameters of the application, such as expected weight of the tote or container, the materials (including coefficient of static friction) of the tote or container and the gripping surface, expected acceleration and deceleration of the end effector 112, and like parameters, as will be understood by persons familiar with robotic or automated package manipulation.

In the embodiment of FIG. 12, in which fingers 256 are moveable relative to body 250, actuators 220 retract such that fingers 256 move inwardly and gripping surfaces 230 engage the totes or containers with sufficient force to enable the tote or container to be grasped and moved by movement of end effector 212. The force used and type of actuator employed may be chosen according to the same parameters as described above for the second embodiment 210.

Actuators 120 and 220 can be pneumatic, linear actuators. The present invention is not limited to pneumatic actuators, nor to linear actuators. For non-limiting example, mechanical actuators such as acme screws, hydraulic actuators, inflatable (bladder) clamps (such as those available from Pawling Engineered Products, Inc.), clamping cylinders or clamping modules, bellows and diaphragm valves, bellows cylinders, and pneumatic muscle-type actuators (referring to all of the latter, such as those available from Festo Group), and the like, are contemplated.

After the totes or containers have been engaged and grasped by gripping surfaces 130 or 230, the actuated arm moves the end effector 112 or 212 such that the totes or containers are positioned onto a pallet. The stack is placed on the pallet, and the actuators 120 or 230 disengage the gripping surfaces 130 or 230 from the totes or containers. The process is repeated to place existing stacks of totes or containers on the pallet adjacent existing stacks.

Arm 8 of first embodiment system 10 may be controlled so as to put first embodiment end effector 12 into position relative to the totes and then to function as described above. Arm 8 for second and third embodiments end effectors 112 and 212 may be controlled to put end effector 112 or 212 into position, and to extend and retract the corresponding actuators according to the descriptions described above. In some applications, containers (such as totes or boxes) may be stacked such that the containers are received randomly or sequentially, and then stacked in order. The column of containers may then be placed on the pallet such that the containers are identified (by conventional means) but the order of the containers are random or uncontrolled. In other applications, a control system may control the infeed of particular or identified totes such that the containers are grouped together in a predetermined way. Thus, according to any application, the stacking of containers into a column and loading the column onto a pallet can be interfaced with other operations in the fulfillment center or other facility by the controller.

Further, in applications in which boxes or like cuboid containers are intended to be stacked, the control system can order or feed boxes to enhance stability of the overall pallet. For example, if it is intended that a pallet to have a mixture of box sizes, a control system can control the infeed (such as into frame 16, where existing) such that a column of boxes have the same or similar footprint.

Some, any, or all of the methods and operations may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

The various examples further can be implemented using one or more user computers, computing devices or processing devices. Such a system can include a number of workstations running any of a variety of commercially-available operating systems and other known applications for purposes such as development and database management. These devices also can include other electronic devices, such as dummy terminals, thin-clients, and other devices capable of communicating via a network.

Operating environments can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various examples.

The robotic arm technology disclosed herein may be employed with machine learning algorithms or artificial intelligence that enhances the control of the fingers and associated structure and function. In this regard, a control system may interpolate from existing information about and experiences with successful and unsuccessful prior sequences of seeing, engaging, and lifting an object according to established principles for computer learning. Further, the inventors contemplate a control system may extrapolate from the information and experiences to establish new sequences and functions for the robotic arm.

In view of the above controls description, the present invention is not intended to be limited to any particular type of hardware or software or any particular control means, but rather is intended to be able to be employed using any suitable controller.

The present invention has been described by employing examples of structure and function. The present invention is not limited to the structure or function described herein, but rather encompasses the structure(s) and function(s) defined in the claims and understood by persons familiar with container handling to flow naturally from the present disclosure. Further, advantages of the structure have been described for context of the invention only. It is not intended that the present invention be limited to any advantage unless expressly stated in the claims.

What is claimed is:

1. An automated container palletizing system comprising:
an end effector including:
a structural, vertical body including a mount for connecting to an automated arm;
multiple pairs of fingers extending from lateral sides of the body in a forward direction, each pair of fingers being mutually parallel, horizontal, and mutually, laterally spaced apart; and gripping surfaces operatively coupled to the fingers for engaging containers;
at least one pair of opposing actuators for moving the gripping surfaces into and out of engagement with the containers, wherein the at least one pair of opposing actuators is configured to move the gripping surfaces inwardly towards each other to engage sidewalls of the at least one container;

whereby the end effector is configured to be moved into a ready position in which the fingers are astride the containers such that the actuators are in position to enable the gripping surfaces to engage the sidewalls of the containers, and wherein the fingers are fixed relative to the end effector body, and the at least one pair of actuators extended inwardly from inboard surfaces of the fingers and are configured to move the gripping surfaces inwardly to engage the sidewalls of the totes.

2. The automated container palletizing system of claim 1 wherein the containers are totes.

3. The automated container palletizing system of claim 1 wherein the gripping surfaces are on distal ends of the at least one pair of actuators.

4. The automated container palletizing system of claim 1 wherein the at least one pair of actuators are pneumatic linear actuators.

5. The automated container palletizing system of claim 1 wherein the at least one pair of opposing actuators comprises multiple pairs of opposing actuators, such that each pair of fingers is connected to a respective pair of actuators for moving the gripping surfaces of the pair of fingers towards each other to grip the sidewalls of the containers, and wherein the containers are cuboid containers.

6. The automated container palletizing system of claim 5 wherein the fingers are fixed relative to the end effector body, and the respective pairs of actuators extend inwardly from opposed inboard surfaces of the fingers and are configured to move the gripping surfaces laterally relative to the fingers to engage the sidewalls of the containers.

7. The automated container palletizing system of claim 6 wherein the gripping surfaces are on distal ends of the actuators.

8. A method of moving containers in a column, comprising the steps of:
(i) stacking multiple containers in a vertical column, wherein the containers in the vertical column are cuboid containers that are stacked one on top of another to comprise a stack of containers;
(ii) moving an end effector to position gripping surfaces of the end effector astride the stack of containers;
(iii) actuating the gripping surfaces toward each other to engage the sidewalls of each container in the stack of containers with the gripping surfaces; and
(iv) moving the stack of containers after the engaging step by moving the end effector, wherein the end effector includes:
  a structural, vertical body including a mount for connecting to an automated arm;
  multiple pairs of fingers extending from lateral sides of the body in a forward direction, wherein the fingers are fixed relative to the end effector body, and
  a pair of opposing actuators extending inwardly from inboard surfaces of the fingers, wherein the actuating step (iv) includes moving the gripping surfaces inwardly via the actuators to engage containers, and
(v) placing a first stack of containers onto a pallet; then repeating steps (i), (ii), (iii), and (iv); and then placing a second stack of containers onto the pallet in close proximity to the first stack.

* * * * *